US008198776B2

(12) United States Patent
Mathoy

(10) Patent No.: US 8,198,776 B2
(45) Date of Patent: Jun. 12, 2012

(54) CURRENT-ENERGIZED SYNCHRONOUS MOTOR, PARTICULARLY FOR VEHICLE DRIVES

(75) Inventor: Arno Mathoy, Grabs (CH); Verena Mathoy, legal representative, Grabs (CH); Anna Mathoy, legal representative, Grabs (CH); Eva Mathoy, legal representative, Grabs (CH)

(73) Assignee: BRUSA Elektronik AG, Sennwald (CH)

( * ) Notice: Subject to any disclaimer, the term of this patent is extended or adjusted under 35 U.S.C. 154(b) by 0 days.

(21) Appl. No.: 12/675,780

(22) PCT Filed: Aug. 28, 2008

(86) PCT No.: PCT/IB2008/053462
§ 371 (c)(1),
(2), (4) Date: Feb. 27, 2010

(87) PCT Pub. No.: WO2009/027938
PCT Pub. Date: Mar. 5, 2009

(65) Prior Publication Data
US 2010/0308686 A1 Dec. 9, 2010

Related U.S. Application Data

(60) Provisional application No. 60/969,628, filed on Sep. 2, 2007.

(30) Foreign Application Priority Data

Aug. 28, 2007 (DE) .......................... 10 2007 040 750

(51) Int. Cl.
H02K 1/24 (2006.01)
H02K 1/26 (2006.01)
H02K 1/27 (2006.01)
H02K 21/12 (2006.01)

(52) U.S. Cl. .............. 310/156.56; 310/156.57; 310/181; 310/156.48; 310/156.49; 310/156.51; 310/269

(58) Field of Classification Search ............. 310/156.56, 310/156.57, 181, 216.106, 216.108, 187, 310/195, 216.127, 216.107, 156.81; H02K 21/14, H02K 21/16, 1/08, 1/24, 1/26, 1/27; H09K 1/27
See application file for complete search history.

(56) References Cited

U.S. PATENT DOCUMENTS 3,126,493 A 3/1964 Honsinger
(Continued)

FOREIGN PATENT DOCUMENTS

DE 584472 C1 12/1930
(Continued)

OTHER PUBLICATIONS

International Search Report and International Preliminary Report on Patentability, dated Feb. 25, 2009, from International Application PCT/IB2008/053462 published in-part as WO2009/027938A3 on Mar. 5, 2009.

(Continued)

Primary Examiner — Quyen Leung
Assistant Examiner — Thomas Truong
(74) Attorney, Agent, or Firm — George Kapsalas; Patentbuero Paul Rosenich AG

(57) ABSTRACT

A current-energized synchronous motor (1) suitable in particular for vehicle drives. It includes a stator (2) and a rotor (3) carrying the energizer winding (7). The rotor (3) has at least two rotor poles (4) with one energizer winding (7) each. The rotor includes at least one selective magnetic flux barrier, in particular in the form of a radial slot (8) along the main axis (4A) of the rotor pole (4). This flux barrier is provided in each rotor pole (4) for increasing the reluctance moment of the current-energized synchronous motor (1).

20 Claims, 3 Drawing Sheets

U.S. PATENT DOCUMENTS

| | | | |
|---|---|---|---|
| 3,652,885 | A | 3/1972 | Honsinger |
| 4,063,123 | A | 12/1977 | Herr et al. |
| 4,118,648 | A * | 10/1978 | Gillet et al. .................. 310/269 |
| 5,378,953 | A * | 1/1995 | Uchida et al. ............ 310/156.59 |
| 5,666,016 | A | 9/1997 | Cooper |
| 5,747,909 | A * | 5/1998 | Syverson et al. ........ 310/156.56 |
| 5,818,139 | A | 10/1998 | Yamagiwa et al. |
| 5,818,140 | A | 10/1998 | Vagoti |
| 6,121,706 | A * | 9/2000 | Nashiki et al. ................ 310/168 |
| 6,147,428 | A * | 11/2000 | Takezawa et al. ....... 310/156.57 |
| 6,147,429 | A * | 11/2000 | Akemakou et al. ........... 310/181 |
| 6,163,097 | A | 12/2000 | Smith et al. |
| 6,239,526 | B1 | 5/2001 | Oh et al. |
| 6,259,181 | B1 | 7/2001 | Kawano et al. |
| 6,271,613 | B1 * | 8/2001 | Akemakou et al. ........... 310/181 |
| 6,300,703 | B1 | 10/2001 | Kawano et al. |
| 6,472,789 | B1 * | 10/2002 | Akemakou ............... 310/156.57 |
| 6,509,667 | B1 | 1/2003 | El-Antably et al. |
| 6,548,931 | B2 | 4/2003 | Liang et al. |
| 6,703,745 | B2 | 3/2004 | Chu |
| 6,727,629 | B1 | 4/2004 | Soghomonian et al. |
| 6,756,870 | B2 * | 6/2004 | Kuwahara ..................... 335/224 |
| 6,769,167 | B2 | 8/2004 | Lee et al. |
| 6,847,143 | B1 * | 1/2005 | Akemakou ............... 310/156.43 |
| 7,141,905 | B2 | 11/2006 | Vollmer |
| 7,358,638 | B2 | 4/2008 | Miyashita et al. |
| 7,358,698 | B2 | 4/2008 | Seguchi et al. |
| 7,504,754 | B2 | 3/2009 | Jahns et al. |
| 7,560,835 | B2 | 7/2009 | Groening et al. |
| 7,628,581 | B2 | 12/2009 | DeSimone et al. |
| 7,701,104 | B2 * | 4/2010 | Akemakou ..................... 310/181 |
| 7,732,965 | B2 * | 6/2010 | Nakayama et al. ...... 310/156.57 |
| 7,847,461 | B2 | 12/2010 | Rahman et al. |
| 8,020,280 | B2 | 9/2011 | Fukumaru et al. |
| 2005/0168089 | A1 | 8/2005 | Miyashita et al. |
| 2006/0103254 | A1 | 5/2006 | Horst |
| 2006/0119203 | A1 * | 6/2006 | Brown et al. ............ 310/156.53 |
| 2006/0119206 | A1 * | 6/2006 | Akemakou ..................... 310/181 |
| 2006/0290316 | A1 * | 12/2006 | Seguchi et al. ............... 318/720 |
| 2007/0120429 | A1 | 5/2007 | Howard et al. |
| 2007/0228862 | A1 | 10/2007 | Welchko et al. |
| 2008/0247515 | A1 | 10/2008 | Probst et al. |
| 2008/0272667 | A1 | 11/2008 | Ionel et al. |
| 2009/0009114 | A1 | 1/2009 | Schunk et al. |
| 2009/0134734 | A1 | 5/2009 | Nashiki |

FOREIGN PATENT DOCUMENTS

| | | | |
|---|---|---|---|
| DE | 2911636 A1 | | 9/1980 |
| DE | 10004175 A1 | | 4/2001 |
| DE | 10143253 A1 | | 4/2002 |
| DE | 10207267 A1 | | 2/2003 |
| DE | 102004002326 A1 | | 8/2005 |
| DE | 102004055317 A1 | | 5/2006 |
| EP | 1703080 A1 | | 9/2006 |
| GB | 2378323 A | | 2/2003 |
| JP | 47-042256 Y1 | | 12/1972 |
| JP | S59-011759 A | | 1/1984 |
| JP | 2001-333553 A | | 11/2001 |
| JP | 2003-518904 A | | 10/2003 |
| JP | 2007300787 A | * | 11/2007 |
| WO | 84/01062 A1 | | 3/1984 |
| WO | 01/48890 A1 | | 7/2001 |
| WO | 20061095887 A1 | | 9/2006 |
| WO | 2007/010934 A | | 1/2007 |
| WO | 20071003553 A1 | | 1/2007 |
| WO | 20071048211 A2 | | 5/2007 |
| WO | 2007/091692 A1 | | 8/2007 |
| WO | 2011/033397 A2 | | 3/2011 |

OTHER PUBLICATIONS

BRUSA Elektronik AG website at Internet address: http://www.bruza.biz.

Antriebsentwicklung (Drive development) at www.brusa.biz, report discussed in paragraph[0015] of Applicant's specification; version 2nd Quarter 2008.

Delaere K et al., "Influence of Rotor Slot Wedges on Stator Currents and Stator Vibration Spectrum of Induction Machines: A Transient Finite Element Analysis," published 2002, from (www.esat.kuleuven.ac.be/elen).

Kirtley Jr., J.I., "Designing Squirrel Cage Rotor Slots With High Conductivity", published in ICEM 2004 (International Conference on Electrical Machines, Kracow, Poland).

* cited by examiner

CURRENT-ENERGIZED SYNCHRONOUS MOTOR, PARTICULARLY FOR VEHICLE DRIVES

CROSS REFERENCE TO RELATED APPLICATIONS

This application is a 35 U.S.C. 371 national stage entry of PCT International App. No. PCT/IB2008/053462 filed on Aug. 28, 2008, claiming benefit of priority to German (DE) application no. 102007040750.7 filed on Aug. 28, 2007, and also claiming benefit of priority as a non-provisional of U.S. provisional application No. 60/969,628 filed on Sep. 2, 2007; the entirety of PCT International Application No. PCT/IB2008/053462 is expressly incorporated herein by reference, for all intents and purposes, as if identically set forth herein.

FIELD OF THE INVENTION

The present invention relates to a current-energized synchronous motor which is suitable in particular for vehicle drives.

PRIOR ART

Review

Since the mid 90s of the previous century, automobile manufacturers and designers were increasingly concerned with hybrid drives for cars and sports cars as well as commercial vehicles. The hybrid drive combines an internal combustion engine with an electric motor (and optionally with a flywheel). If a small internal combustion engine is used only for power generation for the main electric drive (range extender), the term series hybrid is used.

Since battery technology has shown significant progress for some years, battery electric vehicles (BEVs) are also experiencing a new revival.

Requirements regarding an electric main drive of an electric vehicle

In the case of vehicle drives in which the electric motor provides a significant part of the propulsion power, or such a motor is the sole drive unit, the power output is intended to take place in a wide speed and load range with as high efficiency as possible.

Mainly used motor types for electric vehicles

According to the prior art, the asynchronous motor (ASM), a particular design of the permanent-magnet synchronous motor (PSM) and the switched reluctance motor (SRM) are distinguished in particular here. The preferred design of the PSM is based on the position of the magnets in the interior of the rotor (internal permanent magnet motor IPM).

Switched Reluctance Motors (SRM)

DE-A-10207267 describes a reluctance motor having a rotor which consists of a multiplicity of laminated segments which are joined via non-magnetic connecting elements to give a unit. The connecting elements act as flow barriers. Non-magnetic connecting elements are as a rule more expensive than connecting elements of standard steel or have to be made with larger dimensions in order to achieve the same strength values as steel.

Synchronous Reluctance Motors (SyR)

DE-A-10004175 describes a synchronous reluctance motor having continuous flow barriers.

The synchronous reluctance motors (SyR) which are operated with three-phase currents and have a stator similar to that of asynchronous motors are suitable in practice, owing to their simple and robust design (no rotor windings or magnets), for economical industrial drives having a stator diameter of from 150 to 400 mm. Disadvantages are the relatively low torque density in relation to other motor types and a poor power factor, which greatly complicates their use in the vehicle and therefore limits it to stationary applications.

Sine-Wave Motors

According to earlier research (cf. the final report of "Antriebsentwicklung [Drive development]" at www.brusa.biz), an advantage of sine-wave machines is their constant torque output over the angle of rotation and the low noise development from harmonic fields relative to square-wave motors. This also manifests itself in a constant power uptake from the power source (battery or motor inverter).

If the motor inverter takes its power directly from a battery (battery link), the harmonic fields would in the case of square-wave motors result in alternating loads which cause additional losses at the internal resistance of the battery. Since the sine-wave motors have no harmonic fields and therefore achieve a constant power uptake over the angle of rotation, they also cause no additional losses at the internal resistance of the supply battery.

In the narrower choice for a main drive system in which the motor inverter takes its power directly from a battery, types having a sinusoidal air-gap field distribution, such as the asynchronous motor (ASM) and the internal permanent magnet synchronous motor (IPM), are therefore particularly suitable according to the prior art.

Current-Energized Synchronous Motor

As is known, the current-energized synchronous motor (CSM) has a similar stator in comparison with other sine-wave motors. However, the rotor is provided with pronounced poles (non-salient poles or salient poles) with which rotor windings through which direct current flows are coordinated. In current-energized synchronous motors, the energizer power in the rotor must therefore be fed from the outside. The transmission can take place in a non-contact manner (via transformer) in large machines. In the case of smaller motors for vehicle drives, which have a stator diameter from 150 mm to 400 mm, and in the case of those in which a large dynamic range of the rotor current regulation is required, it takes place via brushes and slip rings. Thus, the CSM, together with the direct current motor (DCM) are among the brush-type motors in which power transmission takes place via brushes to the rotor.

Basic Properties of all Synchronous Motors

The rotor of every synchronous motor rotates synchronously with the field of the stator current. If the rotor cannot rotate with the stator frequency, or the stator field cannot adapt to the rotor position, the asynchronous superposition of the rotor and stator fields produces only pendulum moments. When they are used as a vehicle drive, all types of synchronous motors therefore require in principle a frequency inverter controlled via the rotor position.

Basic Properties of Conventional Current-Energized Synchronous Motors

With dynamic energizing, current-energized synchronous motors achieve 2.5 times their nominal moment for about 30 seconds and up to 4 times their nominal moment for about 5 seconds. With their short-term moment, they surpass permanent-magnet synchronous motors of the same size in most cases. The difference is pronounced particularly when a comparison is made with synchronous motors having buried magnets (IPM). In these, the magnets are inserted into slots of the rotor lamellae.

Power Transmission Via Brushes in the CSM

Brush-type motors are frequently also not considered because, according to the prevailing argumentation, this technology would be difficult to market in an innovative product and lifetime limitations due to the mechanical brush wear were to be feared.

As part of a general prejudice, frequently a sufficient distinction is not made between the commutator of a direct current motor (DCM) and the comparatively simple slip ring of a current-energized synchronous motor (CSM). While the total motor power has to be transmitted to the rotor via the commutator in the case of a DCM, the energizer power to be transmitted to the slip ring of the CSM is only in the low one-digit percentage range of the total motor power. In the case of the CSM as in the case of all other synchronous motors for vehicle drives, the actual electrical motor power is transmitted to the stator via the frequency inverter.

Disadvantages of the CSM According to the Prior Art

The torque of a current-energized synchronous motor which is operated without energizing (emergency torque) arises exclusively from the reluctance. The reluctance is a dimensionless variable and is determined by the ratio of the inductance of the longitudinal axis Ld to the inductance of the transverse axis Lq. In salient-pole motors, Ld>>Lq, Ld, the longitudinal inductance, being determined mainly by the air gap, and Lq, the transverse inductance, being determined mainly by the pole geometry.

If, in a current-energized synchronous motor, the energizing fails, only about a ¼ of the nominal moment can be established in the case of conventional salient-pole motors and no moment at all in the case of non-salient-pole motors. This leads to dangerous driving situations under certain circumstances.

Poor or lacking emergency running properties therefore constitute a further reason why those skilled in the art currently believe the current-energized synchronous motor (CSM) to be substantially unsuitable as a vehicle drive (cf. for example the final report cited above).

SUMMARY OF THE INVENTION

Improvement of the Emergency Running Properties by Increasing the Reluctance

It is the object of the invention to provide an improved solution by means of which the above disadvantages of the prior art in the case of current-energized synchronous motors (CSM) can be significantly reduced or eliminated. The current-energized synchronous motor is to be further developed so that it can produce a significant torque for driving a vehicle in emergency operation without energizing. The object of the invention was therefore significantly to increase the torque without energizing by current (reluctance moment) in the case of the current-energized synchronous motor (CSM).

The essential feature of the present invention is that at least one selective magnetic flux barrier, particularly in the form of a radial slot, is provided along the main axis of the rotor pole for increasing the reluctance moment in each rotor pole. According to a further development, the rotor poles are preferably in the form of salient poles.

These flux barriers increase the magnetic resistance for flux lines in the q-axis (quadrature axis) and thus effect an increase in the reluctance.

Advantageous further developments of the achievement according to the invention are described herein.

Technical Preconditions for an Improvement in the CSM

Against this background, the conventional current-energized synchronous motor was used as a starting point and the object was to further develop it for vehicle drives. The invention is based on the discovery according to the invention that the following important preconditions are essential for improving the emergency running properties of the current-energized synchronous motor:

a magnetic barrier along the main axis or d-axis of the rotor pole, which greatly reduces the inductance of the transverse axis (Lq) but which leaves the inductance of the main axis (Ld) at its originally high value, with the result that a large increase in the Ld/Lq ratio, the reluctance, occurs and the torque is increased several times, for example by a factor of 4, without energizing.

Reduction of the Requirement for Strategic Raw Materials

After long experience on the part of the applicant in this area and after overcoming the abovementioned prejudice, it was also recognized that the current-energized synchronous motor offers the technically most advantageous possibility for automobile manufacturers for protecting themselves from the price dependence in the case of expensive high-performance magnetic materials, the so-called rare earth element magnets (REE magnets), for hybrid and electric vehicles.

Current-energized synchronous motors which were improved according to the invention with regard to their emergency running properties are outstandingly suitable as a main drive motor owing to their system properties. If a series manufacturer substitutes the previously generally used permanent magnet synchronous motor having buried magnets (IPM) by a current-energized synchronous motor, any price trend or shortage of the REE raw materials has no effect for the series manufacturer.

Effect of the Invention on the Suitability of the CSM as a Main Drive

It is clear from the disclosure according to the invention that the reluctance moment of the current-energized synchronous motor (CSM) could be significantly increased in the absence of the energizing by the use of a selective magnetic flux barrier, for example in the form of a radial slot in the rotor pole.

Such an emergency torque is a very major advantage in the use as a main vehicle drive—but may be unimportant in certain circumstances in the case of other applications. If for any reason energizing power cannot be transmitted to the energizer windings of the rotor, the level of the torque obtained from the reluctance determines the system properties in emergency operation. The cause of the absence of the energizer power could be, for example, a failure of the rotor current controller, a short-circuit, a break in the electric supply cables or damage to the slip rings.

According to the invention, the reluctance moment of the current-energized synchronous motor itself therefore plays a very important role in vehicle drives, especially in emergency situations when, for the abovementioned reasons, the vehicle necessarily stands, for example, on a railway track or on carriageways with heavy traffic. In such situations, the reluctance moment of the current-energized synchronous motor according to the invention makes it possible to move out of the danger area in order to approach a safe position.

However, with the traditional current-energized synchronous motor—without the reluctance barriers according to the invention—this was not possible because—as mentioned above—the available emergency torque had to be classed as insufficient after the absence of the electrical energizing.

Good Manufacturability of the Invention without Narrowing of the Basic Properties of a CSM The invention is simple to produce by providing the rotor lamellae with a slot-like recess by punching. Smaller webs may therefore remain as connecting bridges in order to give the rotor the necessary intrinsic strength. In a further development of the invention, these mechanically indispensable connecting bridges are, according to the invention, saturated by means of relatively small permanent magnets. The required quantity of magnets corresponds to about 10% of the magnet mass of a hybrid-energized (energized both electromagnetically and by permanent magnets) synchronous motor (HSM) of the same size and about 6% of the permanent magnet synchronous motors of the same size.

The premagnetized permanent magnets are simply pushed into the prepared "pockets" of the flux barriers (slot sections). Without this measure, the flux barriers alone would work only after saturation of the connections with the transverse flux, which however is undesired, and would thereby give a smaller increase in reluctance and thus a lower emergency torque.

Further advantages, variants and details of the invention are given below in the description of the figures and in the patent claims.

BRIEF DESCRIPTION OF THE DRAWINGS

The invention is illustrated in the attached drawings with reference to a working example of the current-energized synchronous motor according to the invention.

DESCRIPTION OF A WORKING EXAMPLE OF THE INVENTION

Cross-Section of the Rotor and Stator

Figure 1:
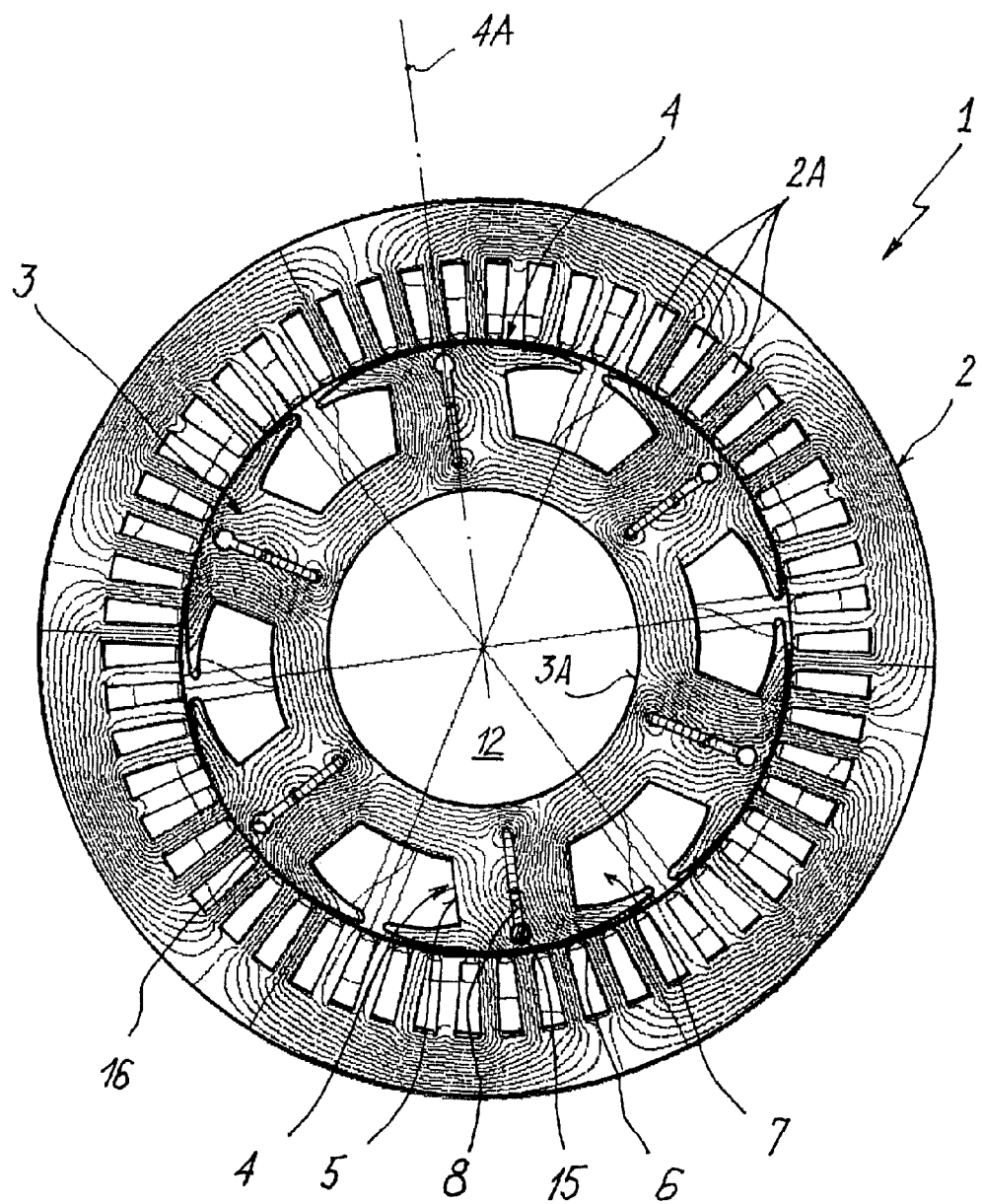
FIG. 1 shows a cross-section of the current-energized synchronous motor according to the invention, with magnetic flux lines.

FIG. 1 schematically shows a cross-section of a working example of a current-energized synchronous motor 1 according to the invention, which is formed in particular for vehicle drives. The synchronous motor 1 is provided with an external stator 2 and an internal rotor 3. The stator 2 is provided in a manner known per se with grooves for a distributed winding 2A.

Rotor Geometry

In the working example shown, the rotor 3 has a 6-pole design (a 2-pole, 4-pole, 8-pole, etc. rotor is optionally also possible). FIG. 1 illustrates the rotor 3 having salient poles 4 whose pole shank and pole shoe are designated by 5 and 6, respectively. One energizer winding 7 each which is arranged along the pole shank 5 and is represented as a cross-sectional area in the diagram is coordinated with each of the rotor poles 4 in a manner known per se.

Flux Barriers Along the Main Pole Axis

According to the invention, a completely novel rotor geometry is presented. According to the present invention, it is proposed to provide at least one selective magnetic flux barrier, preferably in the form of a slot 8 along the main axis 4A of the rotor pole 4 in each rotor pole 4 for increasing the reluctance moment of the current-energized synchronous motor 1. The slots 8 acting as a flux barrier are formed in the pole shanks 5 as central and radial longitudinal openings having substantially parallel lateral surfaces 9. (cf. FIG. 2)

Figure 2:
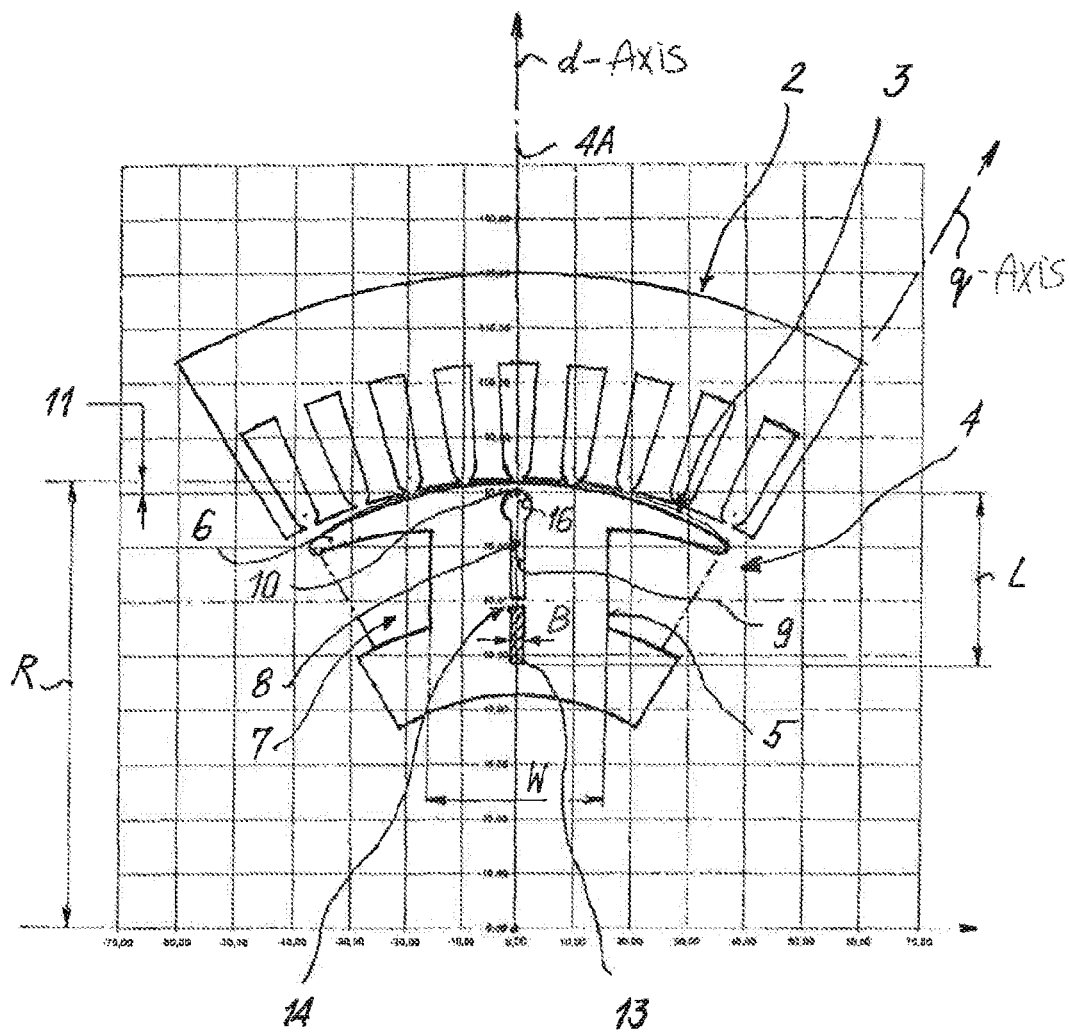
FIG. 2 shows a diagram of an embodiment of the synchronous motor according to FIG. 1 as a result of the design process.

Regarding the more important dimensions and the mutual arrangement of the slot 8 and of the rotor pole 4, it is evident in the case of this working example in FIG. 2 that the relatively narrow radial slot 8 has a length L and a width B. According to experiments by the inventors, the length L of the slot 8 is from ¾ to ⅚ of the rotor radius R minus the radius of the drive shaft 12, and the width B of the slot 8 is between ¹⁄₁₀ and ¹⁄₁₅ of the shank width W.

When viewed in the radial direction, the outermost point 10 of the slot 8 is arranged a distance 11 from the outer pole surface of the pole shoe 6 in such a way that a cap nut fitting the threaded bolt therefore does not project beyond the outer shank pole surface. The pole caps and the rotor lamellae packet are joined by the threaded bolts to give a whole unit.

Presaturation of Webs and Bridges in Flux Barriers

In a preferred embodiment of the current-energized synchronous motor according to the invention as shown in FIG. 2, a relatively small permanent magnet 13 (e.g. altogether 0.2 kg magnet/50 kW rated power) is arranged in the radially inner section of the slot 8 (pocket). The already premagnetized solid-state magnet 13, which is itself a flux barrier, is dimensioned so that its flux lines produced by it are just sufficient to saturate the webs 14 in the flux barrier which are provided for structural reasons but are magnetically conductive per se. The webs 14 presaturated in this manner then represent a high resistance for each further magnetic flux. They therefore behave like an extension of the slot 8 with respect to the useful flux during operation. Their magnetic conductivity which is troublesome for this application is eliminated by the inserted magnet 13.

The web 14 is mechanically advantageous for taking up the resultant centrifugal forces or the compressive forces of the shaft fit between shaft and rotor 3. It is designed precisely according to strength considerations and tailored to the application.

The intended saturation of a mechanically motivated break in the flux barrier in the quadrature axis (q-axis in FIG. 2) of the shank pole motor 1 with a permanent magnetic 13 which is introduced exclusively for this purpose therefore constitutes a fundamental further development of the invention which can also be used in certain circumstances in electric drives regardless of the application described. In this respect, the invention is therefore not limited to a CSM.

Wherever lamellar bridges are required for strength reasons but magnetic flux barriers are more advantageous such magnets can be used for eliminating the magnetic conductivity of the lamellar bridges.

Joining Methods

Figure 3:
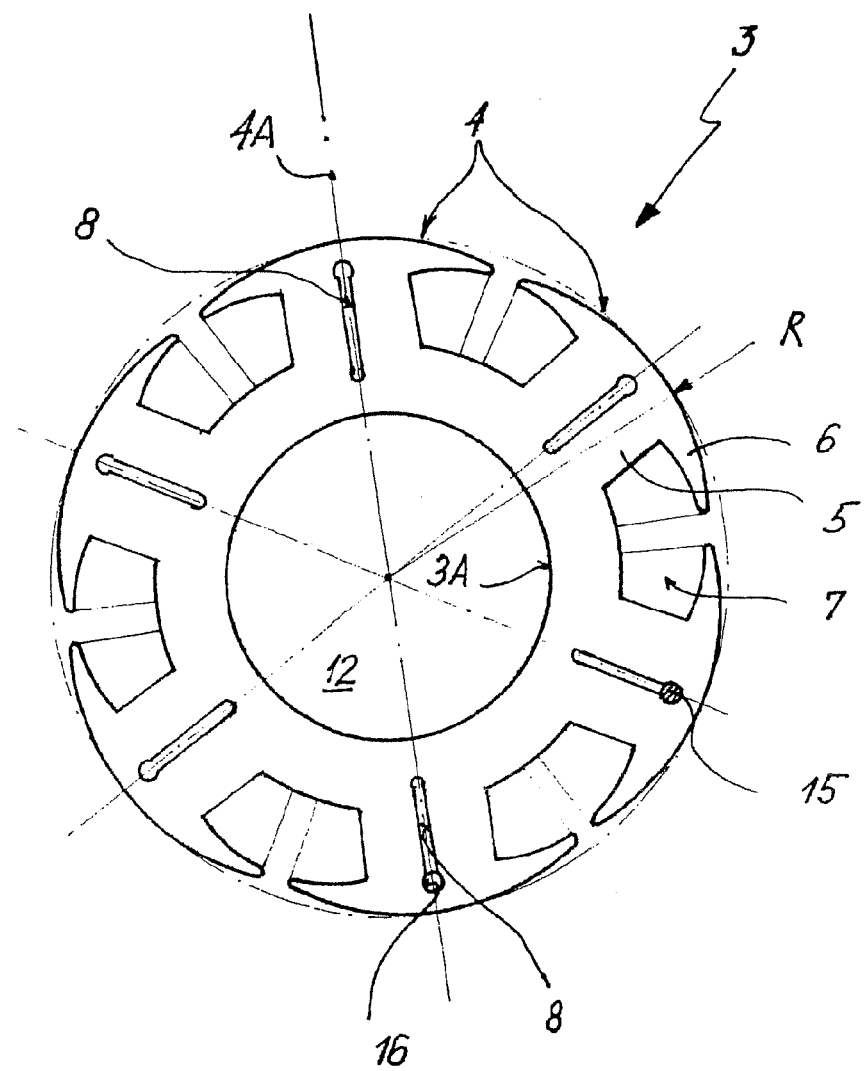
FIG. 3 shows a further side view of the rotor of the synchronous motor according to FIG. 1 without magnetic flux lines.

Although it was not shown in detail the rotor 3 may also consist of traditional lamellae, end plates and a connecting means 15 (e.g. connecting bolts) which connects rotor lamellae packet and end plates to one another to give one piece (in FIGS. 1 and 3, only a sectional picture thereof was shown). According to the present invention, the connecting means 15 should preferably be arranged within the slot 8 acting as magnetic flux barrier. The connecting bolts of the connecting means 15 are inserted into the rotor lamellae and end plates through holes 16 which in the embodiment illustrated—when viewed in the radial direction—practically form the outer end of the slots 8 acting as a flux barrier. In this case the holes 16 have a diameter of about 5.2 mm in order to receive an approximately 5 mm thick clamping bolt.

Improvements Compared with the Prior Art
Increase in the Reluctance

With the flux barriers, the reluctance increases significantly according to the invention and with it the available reluctance moment increases by the factor 3-4 compared with embodiments without flux barriers.

Performance Data of the Working Example Shown

In the investigated machine with 85 Nm nominal moment, experiments by the inventors have shown that an emergency moment of 72 Nm, i.e. almost 90% of the nominal moment, can be realized with the proposed reluctance barriers. Without the reluctance barriers according to the invention, a comparable rotor, which would be manufactured according to the prior art, could generate only about 20 Nm emergency moment without energizing, which is too little for its use as a main drive, even in emergency operation.

The CSM shown can output 320 Nm in short-term operation and with intact energizing. If it is additionally equipped according to the invention with the proposed reluctance barrier, it also has substantially improved emergency properties at lower additional costs. The originally advantageous system properties of the CSM are, however not adversely affected by the reluctance barrier because the CSM according to the invention, too, can be operated with a very high power factor in all operating states and can output a constant power in a wide speed range (greater than 1:5) at very high efficiency.

SUMMARY OF THE EFFECTS

In the preferred current-energized synchronous motor according to FIGS. 1-3, the ratio of the inductance of the longitudinal axis (d-axis) to the inductance of the transverse axis (q-axis in FIG. 2) is accordingly increased well beyond the normal degree of a conventional salient-pole machine as a result of the introduction of a flux barrier running along the d-axis (i.e. a slot 8), the mechanically required residual width in the vicinity of the axis preferably being completely saturated by a permanent magnet 13 introduced into this flux barrier with the result that the effect of the flux barrier is both displayed in the region of the bridges and continues through the web to the axis.

The invention is of course not limited to the working example described. Further embodiments and combinations are also conceivable within the claimed scope of protection on the basis of the above disclosure.

What is claimed is:

1. A current-energized synchronous motor comprising:
a stator;
a rotor configured to rotate in said stator, said rotor including a plurality of assembled lamellae, said rotor including an end plate;
a rotary shaft supporting said rotor for rotation on its axis;
a first salient pole on said rotor, said first salient pole including a first shank, said first salient pole including a first shoe;
an energizer winding on said first pole;
a magnetic flux barrier in said first salient pole, said magnetic flux barrier including a radially-extending longitudinal slot configured to increase the reluctance moment, said slot having a first lateral side surface, said slot having a second lateral side surface substantially parallel to said first lateral side surface, said first and second lateral side surfaces being parallel to a central axis of said longitudinal slot, said central axis of said longitudinal slot being coincident with a main axis of said first salient pole and radially extending through said first shank;
at least one mechanical bridge in said radially-extending longitudinal slot, said mechanical bridge including a web transverse to the central axis of said longitudinal slot and bridging the space between said first and second lateral side surfaces of said slot, said web dividing said radially-extending longitudinal slot into a vacant closed radially-outer portion and a radially inner portion; and,
a permanent magnet in said radially inner portion of said radially-extending longitudinal slot, said permanent magnet configured to generate flux saturating said web to create high resistance for further magnetic flux in said web and reduce magnetic conductivity of said web so as to extend the effect of said magnetic flux barrier to a total region of a longitudinal axis of said first pole, said magnet having a direction of magnetization tangential with respect to a rotational direction of said rotor.

2. A current-energized synchronous motor as claimed in claim 1, further comprising: a radially-outer end on said permanent magnet, said magnet radially-outer end being supported in said radially-extending longitudinal slot by said web.

3. The current-energized synchronous motor as claimed in claim 1, wherein: magnetization of said permanent magnet does not add to a working flux.

4. A current-energized synchronous motor as claimed in claim 1, further comprising: said radially outer portion of said radially-extending longitudinal slot has a radially outward terminal region; and, a fastener configured to pass through said radially outward terminal region of said radially-extending longitudinal slot and retain said plurality of lamellae and said end plate in assembly.

5. The current-energized synchronous motor as claimed in claim 1, wherein: said radially-extending longitudinal slot has a length in the range from ¾ to ⅚ of the difference between the outermost radius of said first shoe and the radius of said rotary shaft.

6. The current-energized synchronous motor as claimed in claim 5, wherein: said radially-extending longitudinal slot has a width in the range from 1/10 to 1/15 of a width of said first shank.

7. A current-energized synchronous motor comprising:
a stator;
a rotor configured to rotate in said stator;
a rotary shaft supporting said rotor for rotation on its axis;
a first salient pole on said rotor, said first salient pole including a first shank, said first salient pole including a first shoe;
an energizer winding on said first pole;
a magnetic flux barrier in said first salient pole, said magnetic flux barrier including a radially-extending longitudinal slot configured to increase the reluctance moment, said slot having a first lateral side surface, said slot having a second lateral side surface, said slot having a central axis, said central axis of said longitudinal slot being coincident with a main axis of said first salient pole and radially extending through said first shank;
at least one mechanical bridge in said radially-extending longitudinal slot, said mechanical bridge including a web transverse to the central axis of said longitudinal slot and bridging the space between said first and second lateral side surfaces of said slot, said web dividing said radially-extending longitudinal slot into a vacant closed radially-outer portion and a radially inner portion; and,
a permanent magnet in said radially inner portion of said radially-extending longitudinal slot, said permanent magnet configured to generate flux saturating said web to create high resistance for further magnetic flux in said web and reduce magnetic conductivity of said web so as to extend the effect of said magnetic flux barrier to a total region of a longitudinal axis of said first pole, said magnet having a direction of magnetization tangential with respect to a rotational direction of said rotor.

8. A current-energized synchronous motor as claimed in claim 7, further comprising:
a radially-outer end on said permanent magnet, said magnet radiall-outer end being supported in said radially-extending longitudinal slot by said web.

9. The current-energized synchronous motor as claimed in claim 7, wherein:
magnetization of said permanent magnet does not add to a working flux.

10. A current-energized synchronous motor as claimed in claim 7, further comprising:
said rotor including a plurality of assembled lamellae, said rotor including an end plate;
said radially outer portion of said radially-extending longitudinal slot has a radially outward terminal region; and,
a fastener configured to pass through said radially outward terminal region of said radially-extending longitudinal slot and retain said plurality of lamellae and said end plate in assembly.

11. The current-energized synchronous motor as claimed in claim 7, wherein:
said radially-extending longitudinal slot has a length in the range from 3/4 to 5/6 of the difference between the outermost radius of said first shoe and the radius of said rotary shaft.

12. The current-energized synchronous motor as claimed in claim 11, wherein:
said radially-extending longitudinal slot has a width in the range from 1/10 to 1/15 of a width of said first shank.

13. A current-energized synchronous motor comprising:
a stator;
a rotor configured to rotate in said stator;
a rotary shaft supporting said rotor for rotation on its axis;
a first salient pole on said rotor, said first salient pole including a first shank, said first salient pole including a first shoe;
an energizer winding on said first pole;
a magnetic flux barrier in said first salient pole, said magnetic flux barrier including a radially-extending longitudinal slot configured to increase the reluctance moment, said slot having a first lateral side surface, said slot having a second lateral side surface, said slot having a central axis, said central axis of said longitudinal slot being parallel with a main axis of said first salient pole and radially extending through said first shank;
at least one mechanical bridge in said radially-extending longitudinal slot, said mechanical bridge including a web transverse to the central axis of said longitudinal slot and bridging the space between said first and second lateral side surfaces of said slot, said web dividing said radially-extending longitudinal slot into an empty closed radially-outer portion and a radially inner portion; and,
a permanent magnet in said radially inner portion of said radially-extending longitudinal slot, said permanent magnet configured to generate flux saturating said web to create high resistance for further magnetic flux in said web and reduce magnetic conductivity of said web so as to extend the effect of said magnetic flux barrier to a total region of a longitudinal axis of said first pole, said magnet having a direction of magnetization tangential with respect to a rotational direction of said rotor.

14. A current-energized synchronous motor as claimed in claim 13, further comprising:
a radially-outer end on said permanent magnet, said magnet radially-outer end being supported in said radially-extending longitudinal slot by said web.

15. The current-energized synchronous motor as claimed in claim 13, wherein:
magnetization of said permanent magnet does not add to a working flux.

16. A current-energized synchronous motor as claimed in claim 13, further comprising:
said rotor including a plurality of assembled lamellae, said rotor including an end plate;
said radially outer portion of said radially-extending longitudinal slot has a radially outward terminal region; and,
a fastener configured to pass through said radially outward terminal region of said radially-extending longitudinal slot and retain said plurality of lamellae and said end plate in assembly.

17. The current-energized synchronous motor as claimed in claim 13, wherein:
said radially-extending longitudinal slot has a length in the range from 3/4 to 5/6 of the difference between the outermost radius of said first shoe and the radius of said rotary shaft.

18. The current-energized synchronous motor as claimed in claim 17, wherein:
said radially-extending longitudinal slot has a width in the range from 1/10 to 1/15 of a width of said first shank.

19. A current-energized synchronous motor comprising:
a stator;
a rotor configured to rotate in said stator;
a rotary shaft supporting said rotor for rotation on its axis;
a first salient pole on said rotor, said first salient pole including a first shank, said first salient pole including a first shoe;
an energizer winding on said first pole;
a magnetic flux barrier in said first salient pole, said magnetic flux barrier including a radially-extending longitudinal slot configured to increase the reluctance moment, said slot having a first lateral side surface, said slot having a second lateral side surface, said slot having a central axis, said central axis of said longitudinal slot being coincident with a radius of said first salient pole and radially extending through said first shank;
at least one mechanical bridge in said radially-extending longitudinal slot, said mechanical bridge including a web transverse to the central axis of said longitudinal slot and bridging the space between said first and second lateral side surfaces of said slot, said web dividing said radially-extending longitudinal slot into an empty closed radially-outer portion and a radially inner portion; and,
a permanent magnet in said radially inner portion of said radially-extending longitudinal slot, said permanent magnet configured to generate flux saturating said web to create high resistance for further magnetic flux in said web and reduce magnetic conductivity of said web so as to extend the effect of said magnetic flux barrier to a total region of a longitudinal axis of said first pole, said magnet having a direction of magnetization tangential with respect to a rotational direction of said rotor.

20. The current-energized synchronous motor as claimed in claim 19, wherein:
said radially-extending longitudinal slot has a length in the range from 3/4 to 5/6 of the difference between the outermost radius of said first shoe and the radius of said rotary shaft.

* * * * *